Figure 1:
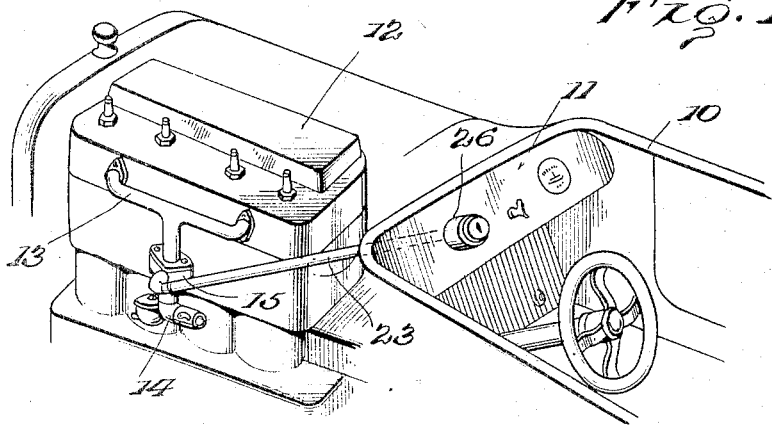

M. E. BASSETT.
LOCKING DEVICE FOR MOTOR VEHICLES.
APPLICATION FILED JUNE 6, 1919.

1,343,609. Patented June 15, 1920.

Inventor.
M. E. Bassett
by Loery & Loery,
Attorneys.

UNITED STATES PATENT OFFICE.

MILLARD EARL BASSETT, OF PONTIAC, MICHIGAN.

LOCKING DEVICE FOR MOTOR-VEHICLES.

1,343,609.  Specification of Letters Patent.  Patented June 15, 1920.

Application filed June 6, 1919. Serial No. 302,308.

*To all whom it may concern:*

Be it known that I, MILLARD EARL BASSETT, a citizen of the United States, residing at Pontiac, in the county of Oakland and State of Michigan, have invented certain new and useful Improvements in Locking Devices for Motor-Vehicles, of which the following is a specification.

This invention relates to an improved locking device for motor vehicles and has as one of its principal objects to provide a device whereby unauthorized operation of the vehicle will be overcome by preventing the flow of fuel mixture from the engine carbureter to the engine of the vehicle.

The invention has as a further object to provide a device employing a valve which may be interposed between the carbureter and engine manifold and wherein an operative connection between this valve and a lock upon the vehicle instrument board or dash will be provided so that the lock may be operated from the driver's seat of the vehicle for locking the valve closed.

And the invention has as a still further object to provide a device wherein it will prove difficult to separate the parts thereof so that the valve of the device may be operated independently of the lock, to the end that the device will prove thoroughly effective in practical use.

Figure 2:
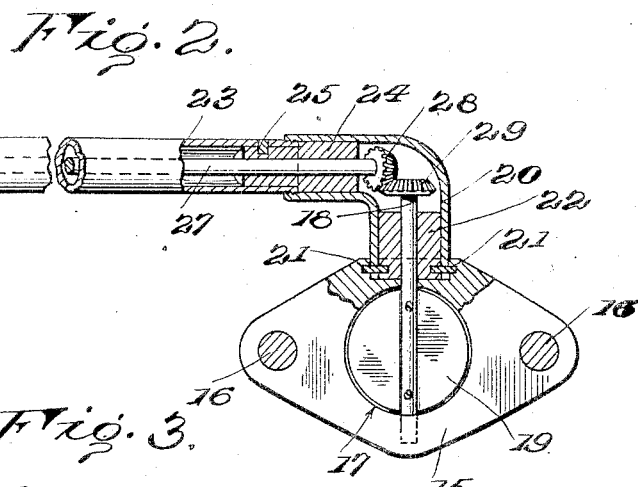
Figure 3:
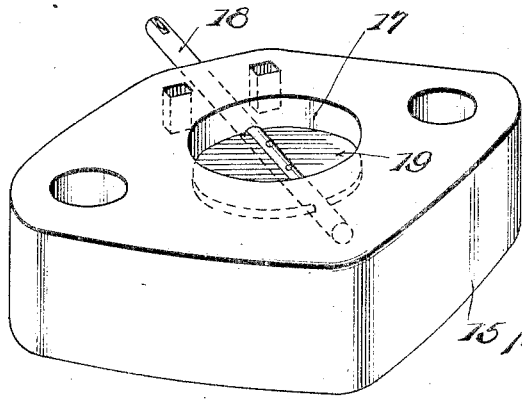

Other and incidental objects will appear hereinafter. In the drawings:

Figure 1 is a fragmentary perspective view showing my improved device in position upon a conventional type of motor vehicle, Fig. 2 is a fragmentary plan view of the device, parts being broken away and shown in section, and Fig. 3 is a perspective view showing the valve of the device in detail.

Referring now more particularly to the drawings, I have, for convenience, shown my improved device in connection with a conventional type of motor vehicle 10 equipped with the usual instrument board 11. The engine of the vehicle is indicated at 12. This engine is provided with an intake manifold 13 with which is associated the engine carbureter 14.

In the present invention I employ a valve body or block 15. This valve body may be constructed of metal or other approved material and is of a shape to fit between the companion flanges of the manifold 13 and carbureter 14, as shown in Fig. 1, to be secured by fastening devices 16 extending through the valve body between the flanges for thus connecting the carbureter with the manifold as well as securing the valve body in position. Formed through the valve body centrally thereof is a passage 17 adapted to register with the passages of the manifold and carbureter and extending diametrically across the passage medially of the valve body is the stem 18 of a butterfly valve 19 adapted to close the passage. This valve stem 18 is suitably journaled upon the valve body and, at its outer end, projects through one side thereof. Around the outer end portion of the stem, the valve body is provided in its adjacent side with a socket in which is seated one end of the elbow 20 of a casing, which elbow is secured to the valve body preferably by spaced keys 21 driven through one side face of the valve body. Fitted within the adjacent end portion of this elbow is a bushing 22 which is also secured by said keys and through which the outer end portion of the valve stem is journaled. Connected at one end to the opposite end of said elbow is a casing tube 23 and fitting within the meeting ends of said tube and the elbow is a bushing 24 to which the tube is secured by a key 25. The tube 23 extends up through the instrument board 11 of the vehicle and suitably secured to the adjacent end of said tube is a lock conventionally shown at 26. This lock may be of any approved type and suitably coupled with the barrel of the lock is a shaft 27 which extends axially through the casing tube 23 and is journaled through the bushing 24. Secured upon the lower end of this shaft is a bevel gear 28 coacting with a bevel gear 29 upon the adjacent end of the stem 18 of the butterfly valve.

As will now be clear, the lock may be operated for closing the valve 19 and locking this valve closed when flow of fuel mixture from the engine carbureter 14 to the engine through the manifold 13 will be cut off. Consequently, the engine can not be started, so that the vehicle will be locked against operation. In this connection, it is to be particularly observed that a person attempting to tamper with the elbow 20 or other parts of the device with intent of opening the valve 19 independently of the lock will find it practically impossible to disconnect the parts so that access may be had to the valve stem, since the elbow 20 housing the outer end portion of the stem is keyed to the valve body while the casing tube 23 is, in turn, keyed to the bushing 24 fixed within the elbow by solder or other suitable means. The casing tube 23 can not, therefore, be easily disconnected from the elbow nor can the elbow be easily disconnected from the valve body. On the other hand, the owner of the vehicle may readily open the valve by simply inserting a proper key in the lock 26 and actuating the lock to rotate the valve. I accordingly provide a particularly effective device for the purpose set forth and a device which, as will now be readily appreciated, may be used in connection with substantially any conventional type of motor vehicle.

Having thus described the invention, what is claimed as new is:

1. A device of the class described including a valve body having a valve and a stem connected to the valve and extending out through one side of the body, said body having a socket in one side and surrounding said stem, a tubular member having one end portion snugly arranged within said socket, a pair of keys carried by said valve body and securely engaging said end portion of the tubular member for non-detachably securing the same within said socket, an operating device arranged wholly within said tubular member, and a lock arranged at one end of said tubular member and connected to said operating device.

2. A device of the class described including a valve body having a valve and a stem connected to the valve, a tubular elbow rigidly and non-detachably connected to said body, the outer end portion of said valve stem being arranged within said tubular elbow in spaced relation to the sides of the same, a bushing rigidly secured in one end portion of said elbow and extending beyond the same, a tubular casing non-detachably connected to the extended end portion of said bushing, a shaft extending centrally through said bushing and operatively connected to said valve stem, a second bushing arranged within said elbow and receiving one end portion of said valve stem, and a lock arranged at one end of said tubular casing and connected to said shaft.

In testimony whereof I affix my signature.

MILLARD EARL BASSETT. [L. S.]